United States Patent
Kuang et al.

(10) Patent No.: US 11,321,324 B2
(45) Date of Patent: May 3, 2022

(54) SYSTEMS AND METHODS FOR CROSS-REGION DATA MANAGEMENT IN AN ACTIVE-ACTIVE ARCHITECTURE

(71) Applicants: Heng Kuang, Markham (CA); Ming Chen, Markham (CA); Kajaruban Surendran, Markham (CA); Zhenhua Hu, Toronto (CA)

(72) Inventors: Heng Kuang, Markham (CA); Ming Chen, Markham (CA); Kajaruban Surendran, Markham (CA); Zhenhua Hu, Toronto (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 318 days.

(21) Appl. No.: 16/731,771

(22) Filed: Dec. 31, 2019

(65) Prior Publication Data
US 2021/0200771 A1   Jul. 1, 2021

(51) Int. Cl.
G06F 16/2455 (2019.01)
G06F 16/23 (2019.01)
G06F 16/27 (2019.01)

(52) U.S. Cl.
CPC .... G06F 16/24552 (2019.01); G06F 16/2379 (2019.01); G06F 16/27 (2019.01)

(58) Field of Classification Search
None
See application file for complete search history.

(56) References Cited

U.S. PATENT DOCUMENTS

| | | | |
|---|---|---|---|
| 9,369,332 B1* | 6/2016 | Smith | H04L 67/2842 |
| 9,830,333 B1* | 11/2017 | Wisniewski | G06F 16/273 |
| 9,973,582 B2 | 5/2018 | Carricarte et al. | |
| 11,050,847 B1* | 6/2021 | Kukreja | H04L 41/0846 |
| 2005/0114285 A1 | 5/2005 | Cincotta | |
| 2011/0225120 A1 | 9/2011 | Cooper et al. | |
| 2019/0155937 A1 | 5/2019 | Barve et al. | |
| 2019/0171650 A1 | 6/2019 | Botev et al. | |
| 2019/0306010 A1 | 10/2019 | Medam et al. | |
| 2020/0133499 A1* | 4/2020 | Vokaliga | G06F 3/0604 |
| 2021/0081433 A1* | 3/2021 | Vig | G06F 16/275 |

FOREIGN PATENT DOCUMENTS

| | | |
|---|---|---|
| CN | 103778136 A | 5/2014 |
| WO | 2019195211 A1 | 10/2019 |

* cited by examiner

*Primary Examiner* — Richard L Bowen

(57) ABSTRACT

Systems and methods for cross-region active-active data replication are described. A system includes a cross-region replication service (CRS), a cross-region synchronization service (CSS), and a conflict-free replication data type (CRDT) module executed by a cache service instance.

21 Claims, 10 Drawing Sheets

SYSTEMS AND METHODS FOR CROSS-REGION DATA MANAGEMENT IN AN ACTIVE-ACTIVE ARCHITECTURE

FIELD

The present disclosure relates to systems and methods for data management in an active-active architecture, including systems and methods for cross-region active-active data replication between key-value cache services in cloud computing.

BACKGROUND

Cloud computing (also referred to the "cloud") is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g., processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis. One type of PaaS is a cache service. A cache service is a service that provides cache for storing data applications running on the computing infrastructure of the cloud. A particular type of cache service is a key-value cache service.

In cloud computing, a key-value cache service is commonly used to enhance performance of a cache service, which is useful for all kinds of cloud-based applications (i.e., applications running on the computing infrastructure of the "cloud") that require minimal response time even during the peak load. A common architecture that is used for a cache service, is an active-active architecture. In an active-active architecture (also referred to as active-active system or active-active service), there is as plurality of independent regions (which may each comprise a cluster of processing nodes) that each provides an instance of a cache service, and each instance of a cache service has a local cache (i.e. a local data store) for storing the same data. The instance of the cache service provided in each region has read and write privileges, and can independently perform write commands to modify the local cache. When instances of a cache service are provided in two different regions and each instance of the cache service attempts to modify the same data stored in their local cache at the same time, a cross-region conflict can arise.

SUMMARY

In various examples, the present disclosure describes systems and methods for cross-region data management for an active-active architecture.

In some examples, key-value cache operations may be compressed on-the-fly, using a suitable compression algorithm selected from different available compression algorithms. A suitable compression algorithm may be chosen on-the-fly, or compression may be skipped altogether, depending on the payload type and/or size of the key-value cache operations. Compression metadata may be recorded in an operation log, to enable the compressed key-value cache operations to be subsequently read.

In some examples, the present disclosure describes techniques for converting non-idempotent key-value cache operations of a cache service to idempotent operations. For example, state-based conflict resolution metadata may be added. State-based conflict-free replicated data types (CRDT) may then be used to resolve any conflicting operations. Conflict resolution metadata may be stored together with the relevant cache data, to enable migration of data together with the relevant metadata.

The examples disclosed herein may enable implementation of a conflict resolution mechanism that does not significantly impact existing implementations of cache services.

In some aspects, the present disclosure describes a system for cross-region data management in an active-active architecture. The system includes: at least one cache service instance belonging to a first region; a first cross-region replication service (CRS) belonging to the first region; and a first cross-region synchronization service (CSS) belonging to the first region. The CRS is configured to: receive a same-region key-value cache operation from the at least one cache service instance; and replicate the key-value same-region cache operation to a second CSS belonging to a second region. The CSS is configured to: receive a cross-region key-value cache operation from a second CRS belonging to the second region; and replay the cross-region key-value cache operation to the at least one cache service instance. The at least one cache service instance is configured to execute a conflict-free replicated data type (CRDT) module to: receive cache data contained in the same-region key-value cache operation from a client of the first region or contained in the cross-region key-value cache operation from the CSS; resolve any conflict between the cache data and existing entries in a cache database belonging to the first region; write the cache data to the cache database; and replicate the written cache data to the CRS.

In any of the preceding aspects, the at least one cache service instance may be further configured to execute the CRDT module to: convert a non-idempotent cache data to idempotent cache data by appending state metadata to the non-idempotent cache data.

In any of the preceding aspects, the at least one cache service instance may be further configured to execute the CRDT module to: store state metadata together with related cache data in a single data structure.

In any of the preceding aspects, the cache data may be associated with related conflict resolution metadata, and the conflict resolution metadata may include information for resolving any conflict with existing entries in the cache database.

In any of the preceding aspects, the at least one cache service instance may be further configured to execute the CRDT module to: determine a conflict between the cache data and an existing entry in the cache database; and resolve the conflict based on a comparison between first conflict resolution metadata associated with the cache data and second conflict resolution metadata associated with the existing entry.

In any of the preceding aspects, the cache data and the conflict resolution data may be stored together in a single data structure.

In any of the preceding aspects, the CRS module may be further configured to: compress the same-region key-value cache operation, wherein the same-region cache key-value operation is replicated to the second CSS as compressed data.

In any of the preceding aspects, the same-region key-value cache operation may be stored in a queue of the CRS module, and the CRS module may be further configured to: compress data in the queue when the data in the queue is at least a threshold size. The same-region key-value cache operation may be replicated to the second CSS as compressed data.

In any of the preceding aspects, the same-region key-value cache operation may be stored in a queue of the CRS module, and the CRS module may be further configured to: compress data in the queue using a selected compression algorithm selected from a plurality of different compression algorithm, the selected compression algorithm being selected based on data types stored in the queue. The same-region key-value cache operation may be replicated to the second CSS as compressed data.

In any of the preceding aspects, the CRS module may be further configured to: generate compression metadata providing information about the selected compression algorithm; and append the compression metadata to the compressed data.

In any of the preceding aspects, the CRS module may be further configured to: write the compressed data together with the compression metadata to a cache operation log maintained in the first region.

In some aspects, the present disclosure describes a method for cross-region data management in an active-active architecture. The method includes receiving cache data contained in a same-region key-value cache operation from a client of the first region or contained in a cross-region key-value cache operation from a cross-region synchronization service (CSS) belonging to the first region (CSS) belonging to the first region; resolving any conflict between the cache data and existing entries in a cache database belonging to the first region; write the cache data to the cache database; and replicating the written cache data to a cross-region replication service (CRS) belonging to the first region.

In any of the preceding aspects, the method further includes: converting non-idempotent key-value cache operations to idempotent key-value cache operations by appending state metadata to the non-idempotent key-value cache operations.

In any of the preceding aspects, the instructions may further cause the apparatus to execute the CRDT module to: store state metadata together with related cache data in a single data structure.

In any of the preceding aspects, the cache data may be associated with related conflict resolution metadata. The conflict resolution metadata may include information for resolving any conflict with existing entries in the cache database.

In any of the preceding aspects, the method includes: determining a conflict between the cache data and an existing entry in the cache database; and resolving the conflict based on a comparison between first conflict resolution metadata associated with the cache data and second conflict resolution metadata associated with the existing entry.

In any of the preceding aspects, the cache data and the conflict resolution data may be stored together in a single data structure.

In some aspects, the present disclosure describes a method for cross-region data management in an active-active architecture. The apparatus method includes: receiving a same-region key-value cache operation from at least one cache service instance belonging to a first region; compressing the same-region key-value cache operation; and replicating the same-region key-value cache operation, as compressed data, to a cross-region synchronization service (CSS) belonging to a second region;

In any of the preceding aspects, the same-region key-value cache operation may be stored in a queue, and the method further includes: compressing data in the queue when the data in the queue is at least a threshold size.

In any of the preceding aspects, the same-region key-value cache operation may be stored in a queue, and the method further includes: compressing data in the queue using a selected compression algorithm selected from a plurality of different compression algorithm, the selected compression algorithm being selected based on data types stored in the queue.

In any of the preceding aspects, the method further includes: generating compression metadata providing information about the selected compression algorithm; appending the compression metadata to the compressed data; and writing the compressed data together with the compression metadata to a cache operation log maintained in the first region.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples in the context of cloud computing, using an active-active architecture. Although certain system diagrams and flowcharts are shown and discussed, these are provided as examples only and are not intended to be limiting.

Figure 1:
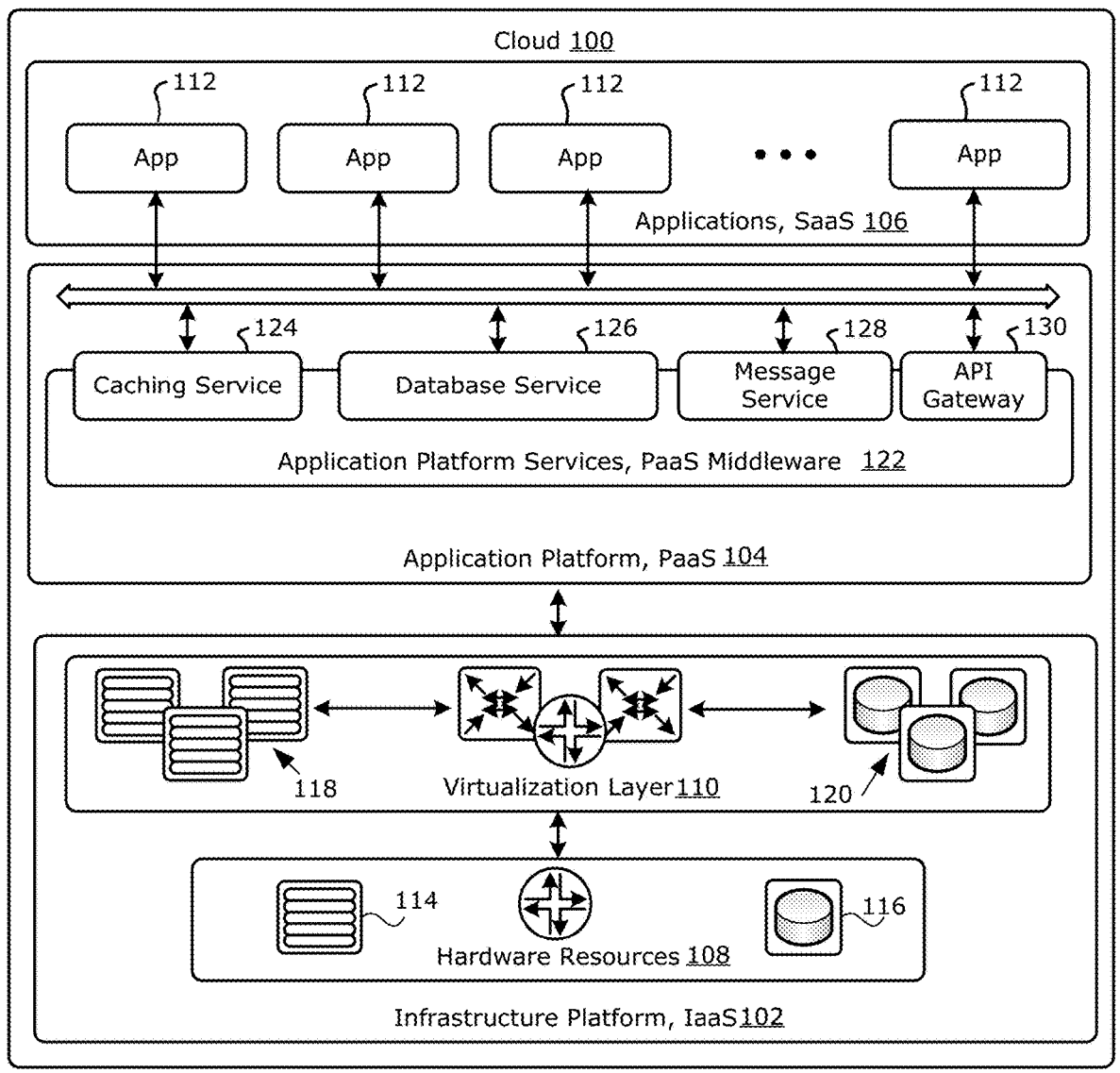
FIG. 1 is a block diagram illustrating a cloud computing architecture for delivering cloud computing services, in accordance with example embodiments described herein.

FIG. 1 is a logical block diagram schematically illustrating a cloud computing architecture that can deliver cloud computing services. The illustrated logical diagram of the cloud computing architecture 100 (referred to hereinafter as the cloud 100) generally comprises an infrastructure platform 102 (e.g., infrastructure as a service (IaaS) layer), an application platform 104 (e.g., platform as a service (PaaS) layer), and applications 106 (e.g., software as a service (SaaS) layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines 114 that include processing resources (e.g., central processing units (CPUs), graphic processing units (GPUs), accelerators, tensor processing units (TPUs)), physical storage 116 that include storage resources such as memory (e.g., static random access memory (SRAM), dynamic random access memory (DRAM), synchronous DRAM (SDRAM), read-only memory (ROM), persistent storage devices (e.g., hard disk drives, optical drives, or a combination thereof), and networking resources (not shown) that are generally resident within a data center. A data center, as will be understood in the art, includes a collection of the physical hardware resources 108 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 110 supports a flexible and efficient multi-tenancy run-time and hosting environment for applications 112 by providing IaaS facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 that may include an appropriate operating system and controlled access to virtualized storage resources 120.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g., processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage. Containers allow a single operating system (OS) kernel to support a number of isolated applications. In place of a hypervisor that allows each VM 118 to run its own OS, a single OS hosts containers that are responsible for enforcing the resource isolation that would otherwise be provided by the VM 118.

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs or the physical machines. In the example depicted in FIG. 1, the application platform services 122 include a cache service 124 for in-memory data storage, a database service 126 for applications, a message service 128 for publishing messages to subscriber customers, and an application program interface (API) gateway service 130 that enables customers to create, publish, and maintain APIs to access other cloud services. It will be appreciated by those skilled in the art that the application platform services 112 may provide other middleware application services to customers, such as notification services, run-time services, and the like. Applications 112 from customers may be deployed and executed within a respective VM 118 or physical machine 114.

In some examples, the cache service 124 may be implemented using a cross-region active-active key-value cache service. A well-designed cross-region cache service 124 should provide fast and reliable bi-directional data replication between regions. There are a number of performance aspects that the cache service 124 should aim to meet (or be close to meeting), in order to be of practical commercial use. Circular data replication among regions should be avoided. Circular data replication occurs when cache data that originates in one region is, after being replicated and performed in another region, is replicated back and performed again in the originating region (leading to a duplication of the operation). Data replication (i.e., replication of cache data) should be fast enough to enable a cache service to catch up with concurrent (or near-concurrent) data changes from all regions, even with the possibility of a slow and/or unstable cross-region network. The cache service 124 should support data replication between a cache service cluster with a plurality of cache service instances and another cache service cluster with another plurality of cache service instances.

Data stored in the local caches (referred to hereinafter as cache data) in all regions should be eventually consistent after data replication. The cache service 124 should provide conflict identification and conflict resolution for data changes, and this conflict identification and resolution should be consistent and relatively fast (e.g., within 1 ms or faster). Any metadata i.e., any data that provides information about data such as creation date of the data, type of data, and an origin of the data) used for conflict resolution of data changes should not impact the data mobility to move data between cache service instances. From the perspective of users of the cache service and cloud computing service providers, any solutions for addressing any of the above should not significantly impact the performance, application, and implementation of the cache service 124.

Some attempts have been made to address one or more of the performance aspects of cache services, including key-value cache services. For example, when a key value cache service instance in one region performs key-value cache operations to insert, delete, or update data stored in its local cache, the key-value cache operations may be compressed before being broadcast to cache service instances in other regions help to reduce the amount of data transported across regions, and to shorten the replication time (i.e., the time to replicate data to the local caches of the cache service instances in the other regions). However, current approaches cannot compress key-value cache operations on-the-fly, because the compressed key-value cache operations and the associated compression attribute (e.g., the selected compression algorithm, original uncompressed size, compressed size, etc.) must be written/read to/from an operation log (e.g., an append only file (AOF) in the case of Redis). Further, current approaches do not enable selection of a suitable compression algorithm for compressing a key-value cache operation from different possible compression algorithms, and do not allow for compression of a key-value cache operation to be skipped altogether, according to different payload type and size of the key-value cache operations. This may result in inefficient and/or unnecessary compression, which may introduce extra operation latency and replication time, thus negatively impacting the performance of the key-value cache service.

Current solutions for resolving conflict of key-value cache operations among regions also have drawbacks that impact the performance of the key-value cache service. An example existing conflict resolution approach is based on consensus/quorum among regions (e.g., majority wins), which has relatively low throughput, thus impacting speed of the cache service. Another existing solution is a "last writer wins" approach, but this approach may result in inaccuracy/inconsistency for applications. Other existing solutions have limitations on resolution of non-idempotent operations (e.g., operation based Conflict-free Replicated Data Types).

Current approaches do not support a slave that replicates key-value cache operations from multiple masters, because there is no built-in functionality for conflict resolution in the slave. Some current approaches add functionality for conflict resolution to the slave directly, however this requires significant changes to the cache service code, which makes the code detached from its open source community and/or makes it difficult to support various user scenarios.

Some existing approaches to resolving conflicts between key-value cache operations (also referred to as key value cache operation conflicts) relies on the use of metadata for conflict resolution (referred to hereinafter as conflict resolution metadata). However, the conflict resolution metadata in such approaches impacts data mobility for moving cache data between cache service instances. For example, some current approaches store the conflict resolution metadata separately from the cache data in the local cache, such as a cache database, thus it cannot be guaranteed that the metadata and cache data will be moved together when re-sharding a cache cluster. Re-sharding a cluster enables a cloud service provider to increase or decrease the number of shards or nodes in a cluster to adapt to changes. Some current approaches store the conflict resolution metadata together with the cache data by changing the data structure of the cache data, however the result is that the cache data cannot be moved to another cache service instance that does not support the new data structure. The present disclosure describes examples that address at least some of the drawbacks discussed above.

Definitions of some terms that may be used in the following discussion are provided below. Where appropriate, such terms may be further defined and/or expanded in the detailed discussion.

Redis: an in-memory data store that can be used to implement a cache or database. Redis is an open-source software that has been used to develop cache services. In the context of Redis, Redis core refers to an implementation of core code that processes cache service requests (e.g., from a client), and Redis module is a plugin that extends Redis functionality and implements new Redis commands without affecting the Redis core. Although Redis is referred to in the present disclosure as an example form of in-memory data store, it should be understood that this is only exemplary and other types of in-memory storage may be used.

Region: a logical and/or geophysical region that has a data center. Each data center provides an instance of a cache service (also referred to herein as a cache service instance).

Cache service cluster: a cluster of cache service instances.

Master: a cache service instance that serves a master role in a master-slave pair. The master processes client requests.

Cache database: a database implementation for a cache service. The cache database may be a data store (i.e., local cache) that stores cache data. The cache database may be a Redis database that stores cache data as key-value pairs.

Slave: a cache service instance that serves a slave role in a master-slave pair. The slave replicates data from its paired master. In the event the paired master is taken offline, crashes or otherwise fails to perform its function, the slave is promoted to the role of a master.

Cross-region replication service (CRS): a CRS replicates cache data from the slaves in the same region. The CRS can be thought of as a slave of the slaves.

Cross-region synchronization service (CSS): a CSS replicates cache data from the CRS of all other regions, and replays that cache data to the masters of its own region. In the present disclosure, "replaying" cache data may involve applying and/or writing cache data from one entity (e.g., the CSS in the role of a cache client) to another entity's database (e.g., the master in the role of a cache service).

Generally, instances of the master, slave, CRS and CSS may be processes running on one or more physical machines, virtual machines 118, or containers provided by the IaaS. Generally, an instance of the master, slave, CRS or CSS may be considered to have physicality when any process may be running on a physical machine (e.g., a physical server). For simplicity the present disclosure will refer to the master, slave, CRS and CSS rather than referring to instances of the master, slave, CRS and CSS.

Append only file (AOF): an AOF is a log file that records the key-value cache operations which change the state of local cache database of a cache service. Read commands will not be logged in log file as it will not change the state of database. The contents of the log file may be used to recover cache data (e.g., can be loaded to a restarted cache service to recover old cache data, in the event of a crash of the cache service).

Client: a client sends caching requests to a cache service.

Conflict-free replication data type (CRDT): a type of data structure that enables conflict resolution among key value cache operations including writing commands, deleting commands, updating commands, when replicating cache data and metadata across multiple cache service instances. CRDT data structures may be implemented using a CRDT module (which may also be referred to as a CRDT-Agent) that adds to the functionality of an existing data store (e.g., the Redis core). The CRDT module may be loaded and initialized when a cache service instance is started up. The CRDT related functions may be implemented using a new implemented Redis command CRDT.SET, for example; and the SET command that is original to the Redis core may be implemented using a new implemented Redis command NATIVE.SET, for example.

Further details will be understood in the context of the figures as discussed below.

Figure 2:
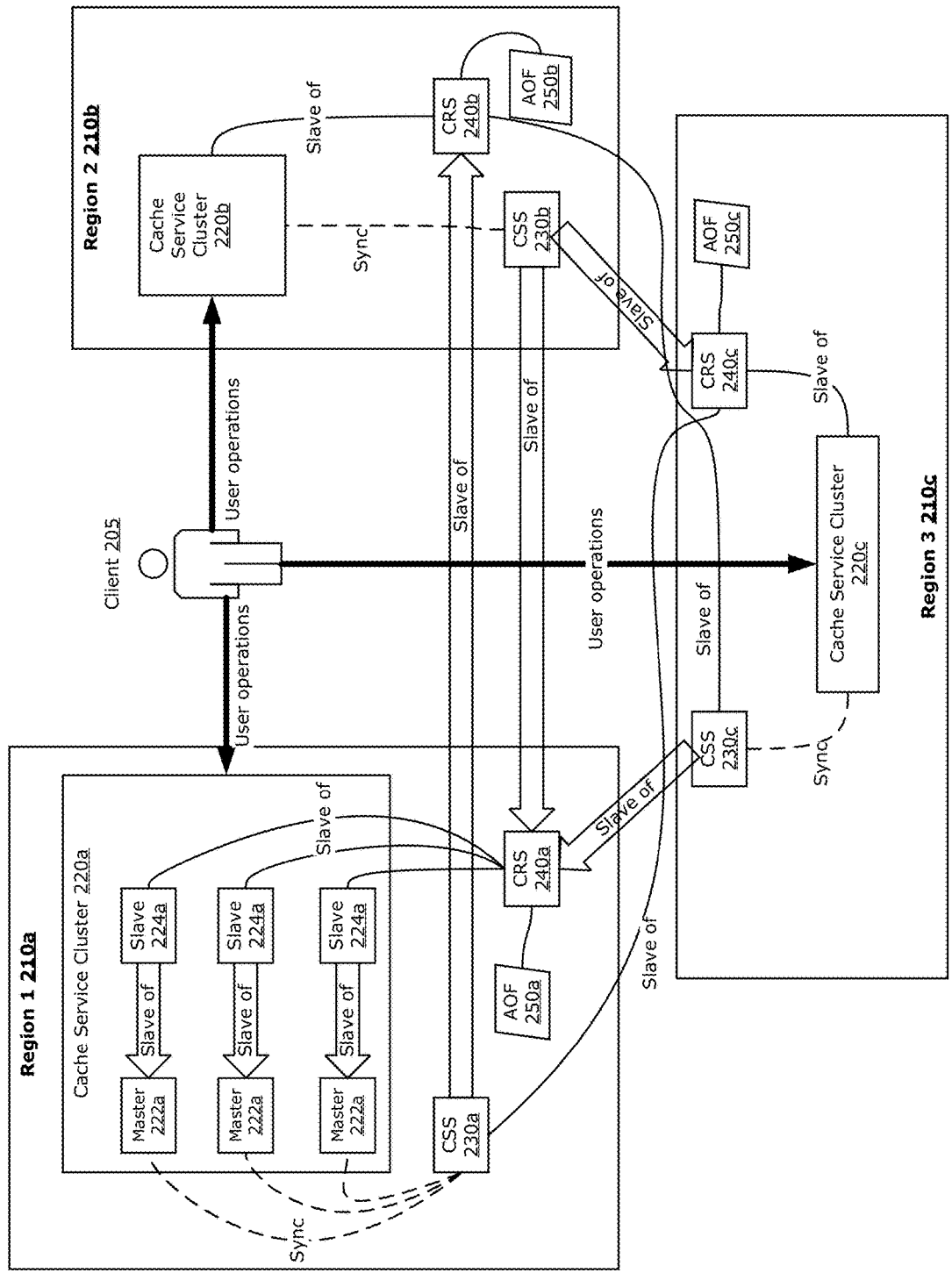
FIG. 2 is a block diagram illustrating an example system implementing an active-active architecture, in accordance with example embodiments described herein.

FIG. 2 is a block diagram illustrating an example system 200 implementing an active-active architecture, in accordance with examples disclosed herein. The system 200 may be used to implement the cache service 124 illustrated in FIG. 1. The system 200 may enable cross-region active-active cache data replication between key-value cache service instances in multiple regions.

The system 200 includes cache service clusters distributed among different regions. A cache service cluster, together with any supporting servers or modules local to the cache service cluster, may be referred to as a region, with each region instantiating a respective instances of the cache service 124 (e.g., a respective instance of a key-value cache service). In the example shown, the system 200 includes three regions, namely region 1 210a, region 2 210b and region 3 210c (generally referred to as region(s) 210). Although three regions 210 are shown, system 200 may have greater or fewer numbers of regions 210. The regions 210 may be in different geographic locations, and may be distributed globally, for example. Although the present disclosure describes examples in which clusters are used in each region 210, in some examples a single instance of a cache service (e.g., single instance of a key-value cache service) may be used instead of a cache service cluster.

Each region 210 includes a respective cache service cluster 220a, 220b, 220c (generally referred to as cache service cluster(s) 220), a respective cross-region synchronization service (CSS) 230a, 230b, 230c (generally referred to as CSS(s) 230), and a respective cross-region replication service (CRS) 240a, 240b, 240c (generally referred to as CRS(s) 240). Each CRS 240 creates and maintains a respective append only file (AOF) 250a, 250b, 250c (generally referred to as a AOF250 and collective referred as AOFs), which logs key-value cache operations. A client 205 (or application user) may send user operations, such as write operations to insert, delete, and update cache data, and read operations to read cache data, to any of the regions 210. The user operations sent to a given region 210 are received by the cache service cluster 220 in the respective region 210.

For ease of understanding, only region 1 210a is illustrated in detail, and regions 2 and 3 210b, 210c have been simplified. The cache service cluster 220a of region 1 210a is now described. It should be understood that each region 210 in the system 200 may operate similarly to region 1 210a as described below. The cache service cluster 220a includes a plurality of master-slave pairs (three such master-slave pairs are shown for example only), each master-slave pair having a master 222a, and a slave 224a (generally referred to as master(s) 222 and slave(s) 224).

Figure 3:
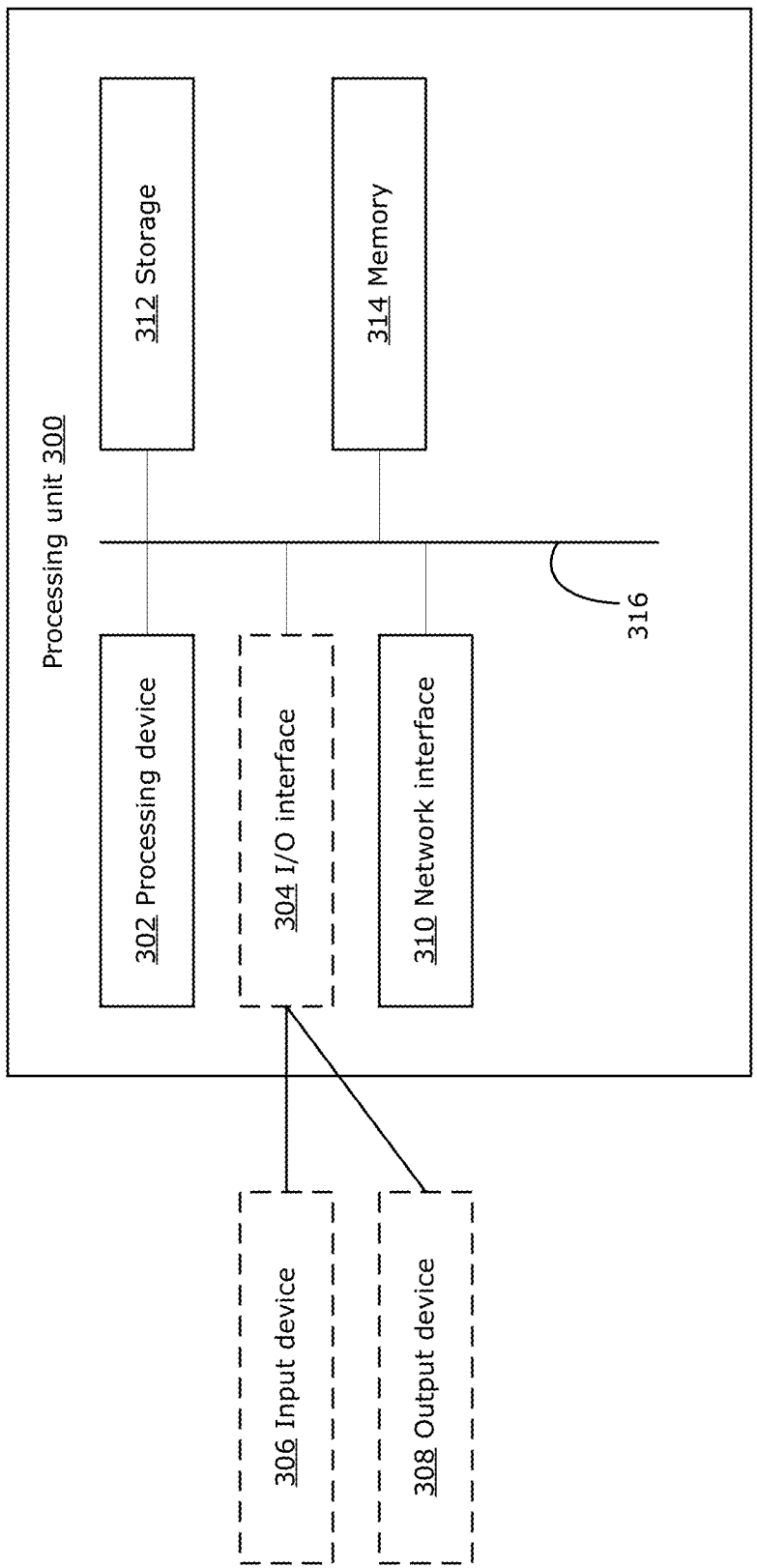
FIG. 3 is a block diagram illustrating a simplified example of a processing unit, which may be used to implement one or more of the entities shown in the architecture of FIG. 2.

FIG. 3 is a block diagram illustrating a simplified example of a processing unit 300, which may be used to run one or more of the processes shown in FIG. 2, such as the processes to instantiate the masters 222, slaves 224, CSSs 230 and/or CRSs 240. Other examples suitable for implementing embodiments described in the present disclosure may be used, which may include components different from those discussed below. Although FIG. 3 shows a single instance of each component, there may be multiple instances of each component in the processing unit 300.

The processing unit 300 may include one or more processing devices 302, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The processing unit 300 may also include one or more optional input/output (I/O) interfaces 304, which may enable interfacing with one or more optional input devices 306 and/or optional output devices 308.

In the example shown, the input device(s) 306 (e.g., a keyboard, a mouse, a microphone, a touchscreen, and/or a keypad) and output device(s) 308 (e.g., a display, a speaker and/or a printer) are shown as optional and external to the processing unit 300. In other examples, there may not be any input device(s) 306 and output device(s) 308, in which case the I/O interface(s) 304 may not be needed.

The processing unit 300 may include one or more network interfaces 310 for wired or wireless communication with entities within a region 210 (also referred to as same-region communications) or with entities in another region 210 (also referred to as cross-region communications) in the system 200. The network interface(s) 310 may include wired links (e.g., Ethernet cable) and/or wireless links (e.g., one or more antennas) for same-region and/or cross-region communications.

The processing unit 300 may also include one or more storage units 312, which may include a mass storage unit such as a solid state drive, a hard disk drive, a magnetic disk drive and/or an optical disk drive.

The processing unit 300 may include one or more memories 314, which may include a volatile or non-volatile memory (e.g., a flash memory, a random access memory (RAM), and/or a read-only memory (ROM)). The non-transitory memory(ies) 314 may store instructions for execution by the processing device(s) 302, such as to carry out examples described in the present disclosure. For example, in the case where the processing unit 300 is a cache service server (e.g., a master 222 or a slave 224), the memory(ies) 314 may store instructions for executing the functions of a conflict-free replicated data type (CRDT) module, as discussed further below.

The memory(ies) 314 may include other software instructions, such as for implementing an operating system and other applications/functions. In some examples, the processing unit 300 may additionally or alternatively execute instructions from an external memory (e.g., an external drive in wired or wireless communication with the processing unit 300) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing unit 300 may also include a bus 316 providing communication among components of the processing unit 300, including those components discussed above. The bus 316 may be any suitable bus architecture including, for example, a memory bus, a peripheral bus or a video bus.

Reference is again made to FIG. 2. The cache service cluster 220 is a cluster of cache service instances (e.g., the masters 222 and slaves 224) that provide the cache service 124 (see FIG. 1), which is one of the application platform services 122. A cache database is also provided (e.g., distributed over) the cache service instances (e.g., the masters 222 and slaves 224). The CSS 230 and CRS 240 also operate to provide the cache service 124, as discussed further below. A conflict-free replicated data type (CRDT) module is implemented by each cache service instance of the cache service cluster 220. Instances of the master 222, slave 224, CRS 240 and CSS 230 may be processes running on one or more physical or virtual machines 118, or in containers. For simplicity the present disclosure will refer to the master 222, slave 224, CRS 240 and CSS 230 rather than referring to instances of the master 222, slave 224, CRS 240 and CSS 230.

Redis is an open-source software that enables key-value caching. The CRDT module disclosed herein may also be implemented as a Redis module.

FIG. 2 illustrates some example relationships between entities in the system 200, which will now be discussed. In the present disclosure, relationships between entities within the same region 210 may be referred to as same-region key-value operations, and relationships between entities in different regions 210 may be referred to as cross-region key-value operations.

The CRS 240 in each region 210 serves to replicate key-value cache operations from the master-slave pairs in the respective region 210. Thus, the CRS 240 acts as a same-region slave of the slave(s) 224 within the cache service cluster 220 of the respective region 210 (e.g., as shown by arrows in FIG. 2). This arrangement leverages the existing master-slave replication mechanism that is native to key-value cache services, which may enable easier implementation without little or no impact on other cache service code. Further, by using existing mechanisms provided by the native cache service code, examples of the present disclosure may be implemented as a patch or plugin module on top of the existing core code, and may be implemented in a manner that is transparent to clients of the cache service (i.e., the procedures by clients remain unchanged, and the clients are unaware of any change to the cache services). It will be appreciated that users of cache service or applications access the local cache (e.g., the cache database) through clients. The CRS 240 may also perform compression on the replicated key-value cache operations, before cross-region replication of the key-value cache operations to other cache service instances. The compression may be performed on-the-fly, may be using a compression algorithm selected from multiple different possible algorithms, and may be omitted altogether, as discussed further below.

The CRS 240 of one region 210 replicates the key-value cache operations to the respective CSS 230 of each other region 210. Thus, the CSS 230 in each region 210 acts as a cross-region slave of the CRS(s) 240 of every other region 210. In the example of FIG. 2, arrows indicate the cross-region slave relationship of each CSS 230 to each cross-region CRS 240. For example, the CSS 230a of region 1 210a acts as a slave to the CRSs 240b, 240c or regions 2 and 3 210b, 210c.

The CSS 230 of a given region 210 serves to synchronize the received key-value cache operations to the same-region master(s) 222, in the cache service cluster 220 of the respective region 210. The master(s) 222 replicates the cache key-value operations to respective slave(s) 224.

Each cache service instance of the cache service cluster 220 (e.g., the master(s) 222 and slave(s) 224) implements a CRDT module. The CRDT module, in some examples, provides functions for converting non-idempotent key-value cache operations to idempotent key-value operations. In the present disclosure, an idempotent key-value operation is a key-value operation that, whether performed once or more than once, achieves the same resulting state. In other words, an idempotent key-value operation is a key-value operation that will not lead to an error in the state of the local cache (e.g., the cache database) if the key-value cache operation is inadvertently repeated. For example, a key-value cache operation "set count=2" is idempotent because no matter how many times the operation is sent and performed, the result is that the count is set to value 2. However, the key-value cache operation "increment count by 1" is non-idempotent because each repetition of the key-value operation changes the count value. In some examples, an idempotent key-value operation may also be referred to as a state-based key-value operation or state-defined key-value operation. For active-active data replication systems, idempotent key-value operations may be preferred over non-idempotent key-value operations, to avoid erroneous data due to inadvertently repeated replicated key-value operations.

The CRDT module, in some examples, also provides functions for resolving key-value cache operation conflicts (i.e., conflicts between key-value cache operations), using a state-based CRDT. The CRDT module, in some examples, also provides functions for co-locating conflict resolution metadata together with the relevant cache data. As discussed herein, the conflict resolution may avoid intruding upon existing data structure and code.

The CRS 240, CSS 230 and CRDT module (implemented in the cache services) operate together to provide cross-region active-active data replication in the key-value cache service. Some aspects of the present disclosure also describe the operation of each of these entities by itself. Thus, the present disclosure includes operation of the system 200 as a whole, as well as operation of individual entities within the system 200.

Figure 4:
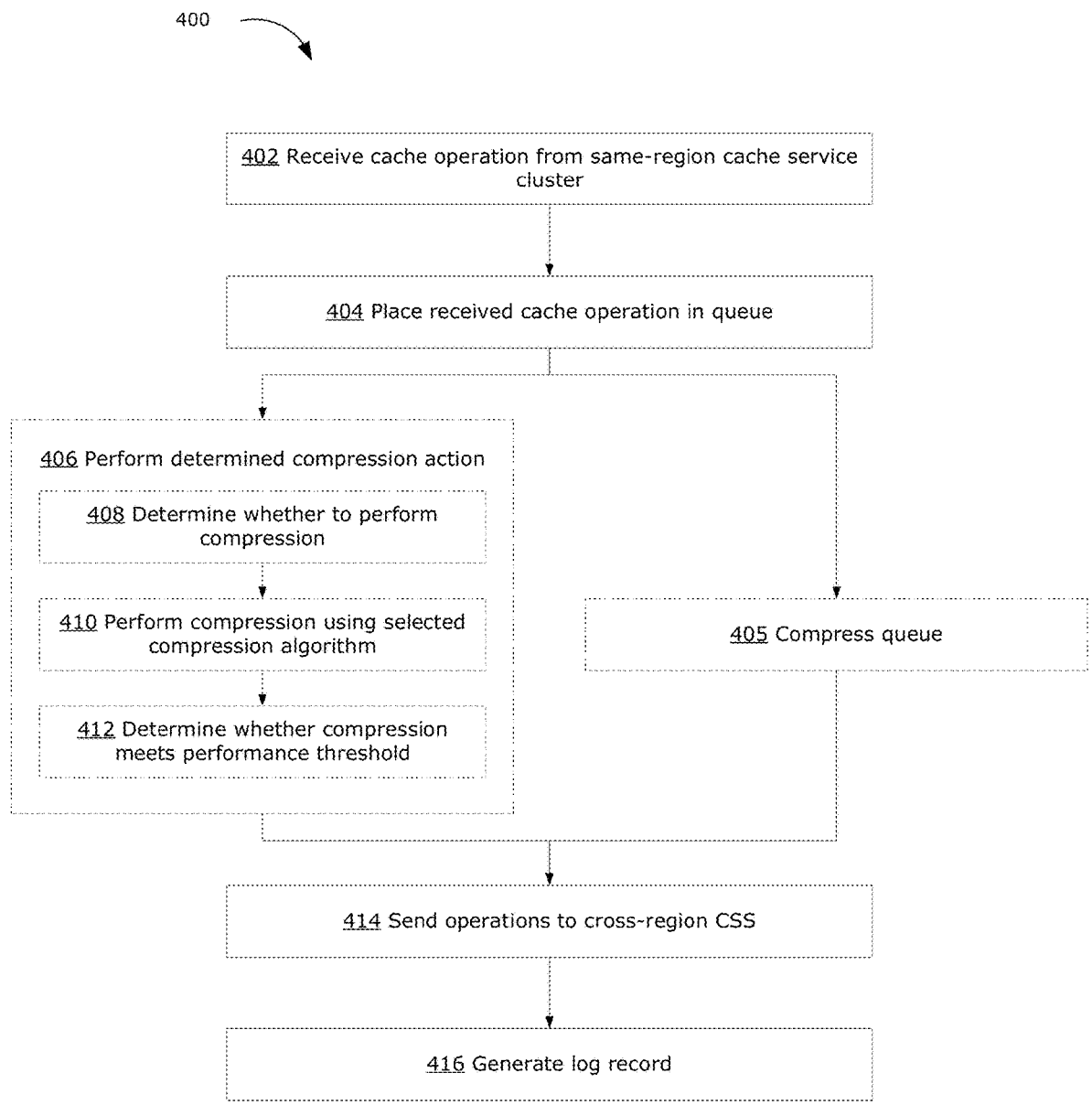
FIG. 4 is a flowchart that illustrates an example method that may be performed by the CRS in the architecture of FIG. 2.

FIG. 4 is a flowchart that illustrates an example method 400 that may be performed by the CRS 240 as part of its functions. The CRS 240 may perform the method 400 to enable cross-region replication of cache data.

At 402, the CRS 240 in a given region 210 receives a key-value cache operation from the same-region cache service cluster 230. For example, the key-value cache operation may be forwarded from the CRDT module of a slave 224 in the cache service cluster 230.

At 404, the received key-value cache operation is placed in a queue at the CRS 240. A sequence number may be generated and assigned to that key-value cache operation prior to or when the key-value cache operation is placed in the queue. The CRS 240 may continue to push received key-value cache operations to the queue until there is a trigger to send the queued key-value cache operations to a cross-region CSS 230. The trigger may be, for example, a threshold size of the queue (e.g., queue key-value cache operations are sent whenever there are at least 10 queued key-value cache operations, or whenever the queued key-value cache operations total at least 1 Mb), an expiry of a timer (e.g., queued key-value cache operations are sent every 1 s), or any other suitable trigger. The trigger may cause transmission (with optional compression) of the queued key-value cache operations in a smaller block than existing approaches. Current approaches typically compress and transmit an entire queue, which may result in slower operation and may have a higher likelihood that a single error will result in resending of the entire queue.

Optionally, at 405, the queued key-value cache operations are compressed, for example using a static compression algorithm.

Alternatively and optionally, instead of step 405, at 406 a determined compression action may be performed for the queued key-value cache operations. Step 406 may include optionally determining whether compression should be performed at all (at step 408), optionally selecting a compression algorithm from different available compression algorithms and performing the compression using the selected compression algorithm (at step 410) and/or optionally determining whether, after performing compression, the compression meets a predefined threshold (at 412).

At optional step 408, the size of the queue (e.g., the total byte size of the queued key-value cache operations) may be evaluated and compared against a predefined threshold size (e.g., 1 kB, 5 kB, or 10 kB, among other possibilities). If the queue size is below the predefined threshold size, compression may be skipped altogether and the method may proceed directly to step 414. It may be appropriate to skip compression when the size of the queue is small, in order to reduce processor time (both during the compression and during the subsequent decompression), because the small size of the queue means that compression may have little or no benefit for improving cross-region transmission.

If, at 408, it is determined that compression should be carried out, or if step 408 is not performed, optional step 410 may be carried out. At optional step 408, compression of the queue is performed using a selected compression algorithm. The selected compression algorithm may be selected from a plurality of different available compression algorithms. The selected compression algorithm may be selected by identifying the compression algorithm among the plurality of different available compression algorithms that would be expected to achieve a good or the best compression ratio/efficiency. For example, the type of key-value operations that occurs the most in the queue may be identified, and the compression algorithm that is best suited to that type (e.g., that maps to that type, for example based on a lookup table, a predefined rule or other reference) may be selected. The key-value cache operations in the queue may then be compressed using the selected compression algorithm.

Optionally, at 412, after the queue has been compressed, a determination may be made whether the compression meets a predefined performance threshold. For example, an evaluation of the size of the queued key-value cache operations before and after compression may be done (e.g., by calculating the compressed data as a percentage of the uncompressed data), and compared against the predefined performance threshold (e.g., the compressed data should be no more than 50% of the uncompressed data). If the performance threshold is not met, it may be determined that compression should not be performed. This may be appropriate because the benefit of compression does not outweigh the overhead for subsequent decompression. If it is determined that compression should not be performed, then the uncompressed operations are used in subsequent steps.

If it is determined that compressed should be performed, then the compressed key-value cache operations are used in subsequent steps. Compression metadata may also be generated to provide information about compression attributes (e.g., the selected compression algorithm, original uncompressed size, compressed size, etc.) that may be used for later decompression. The compression metadata may be packaged with the compressed cache data by appending the compression metadata to the compressed cache data. The packaged compression metadata and the compressed cache data have the same format as the record in AOF of key-value cache service (e.g., RESP for Redis). Such compression metadata may be unique because it provides information unique to the dynamic compression disclosed herein. Current techniques that rely on static compression may not use such compression metadata because the compression action is fixed and known.

Figure 5:
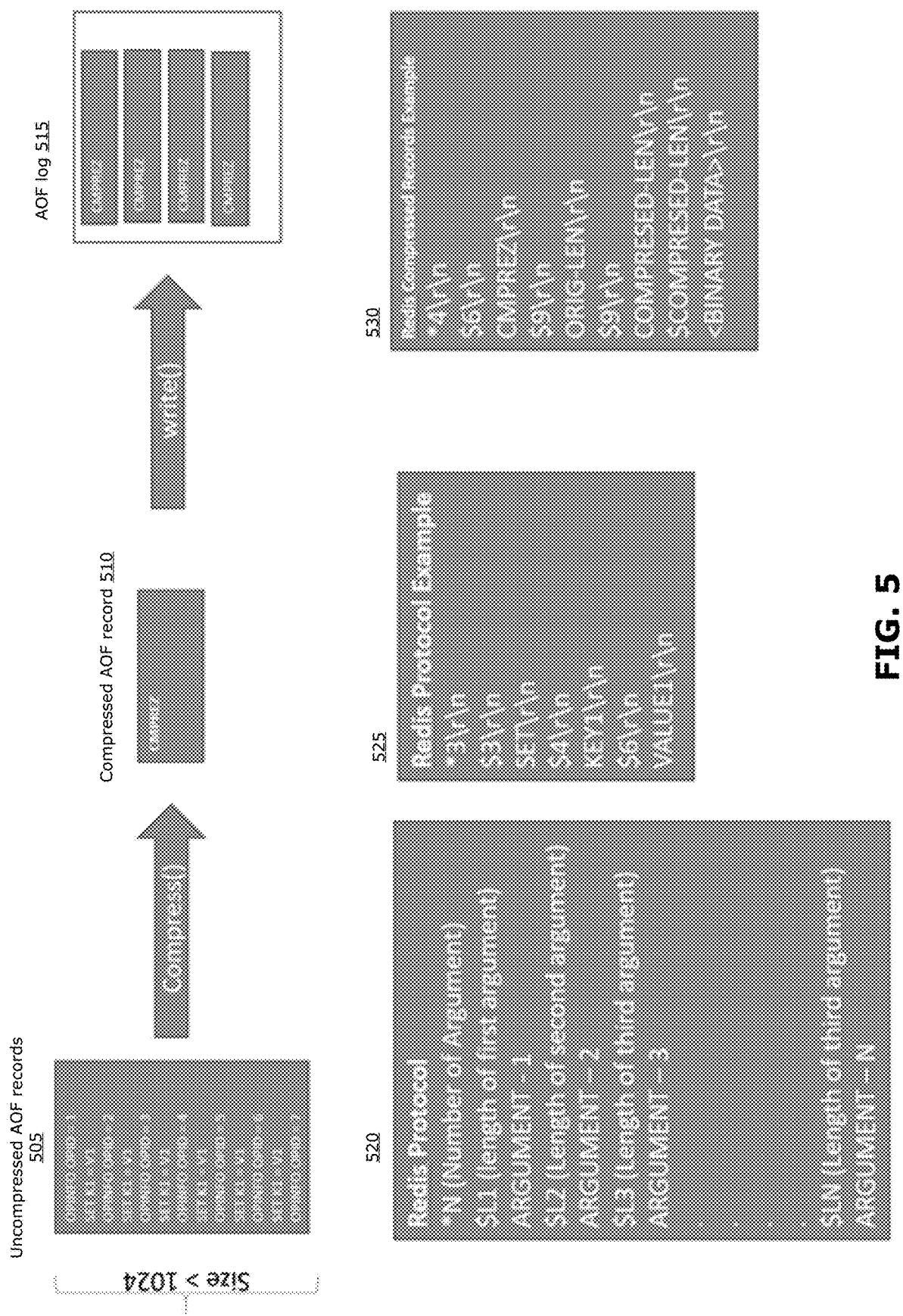
FIG. 5 shows an example of how operation records may be compressed and written to the operations log.

FIG. 5 illustrates an example of how AOF records may be compressed and written to a log file (i.e. the AOF), as disclosed herein. Generally, current techniques have to compress/decompress the whole AOF log but cannot compress/decompress individual AOF records in the AOF log dynamically during runtime. In contrast, such dynamic compression/decompression of individual AOF records may be possible using examples of the present disclosure.

FIG. 5 illustrates an example high level view of how records may be compressed in an AOF file. Regular uncompressed AOF records 505 may have a size over 1 kB, for example. These records 505 may be compressed (e.g., using a compress( ) function) into a single compressed record 510. In this example, the compressed record 510 has a COMPREZ format. The compressed record 510 may then be written to the AOF log 515 (e.g., using a write( ) function), which now contains a plurality of compressed records (in this example, all in the COMPREZ format). A bunch of original/regular records (left box) are compressed to a COMPREZ record (middle box); a bunch of COMPREZ records make the new/compressed AOF file (right box).

FIG. 5 also illustrates an example detailed view of how a record may be changed by the compression. An example format 520 for a record according to the protocol defined by Redis is shown. An example record 525 that follows the format 520 defined by the Redis protocol is also shown. An example compressed record 530 is also shown, following the COMPREZ format. Notably, the compressed record 530 is associated with compression related metadata, such as data describing the original length and the compressed length.

Notably, information about compression attributes (e.g., compression metadata) may be added to the AOF records. This may enable data to be correctly recovered from the AOF records. It should be noted that the compression metadata may also be removed from the AOF records if required (e.g., if the AOF records are to be used by processes that do not recognize the compression metadata).

Reference is again made to FIG. 4. At 414, the key-value cache operations in the queue (which may have been compressed) are sent by the CRS 240 to one or more cross-region CSSs 230. Generally, the CRS 240 in one given region 210 sends the queued key-value cache operations to all CSSs 230 in all other regions 210 of the system 200, to ensure cache data replication across the system 200.

At 416, the CRS 240 generates log record(s), with information about the sent operations, to be added to its log file (e.g., the AOF 250). The record(s) may comprise a list of the key-value cache operations that were sent at 414, with each key-value cache operation being an individual record. In some examples, the record(s) may be compressed into a single compressed record before being added (e.g., written) to the cache operation log.

In some examples, step 416 and 414 may be performed in parallel (e.g., the log record(s) are generated and added (e.g. written) to the cache operation log as the logged key-value cache operations are being sent to cross-region CSS(s) 230). In some examples, step 416 may be performed prior to step 414 (e.g., the log record(s) are generated and added (e.g. written) to the cache operation log before sending the logged key-value cache operations to cross-region CSS(s) 230).

Figure 6:
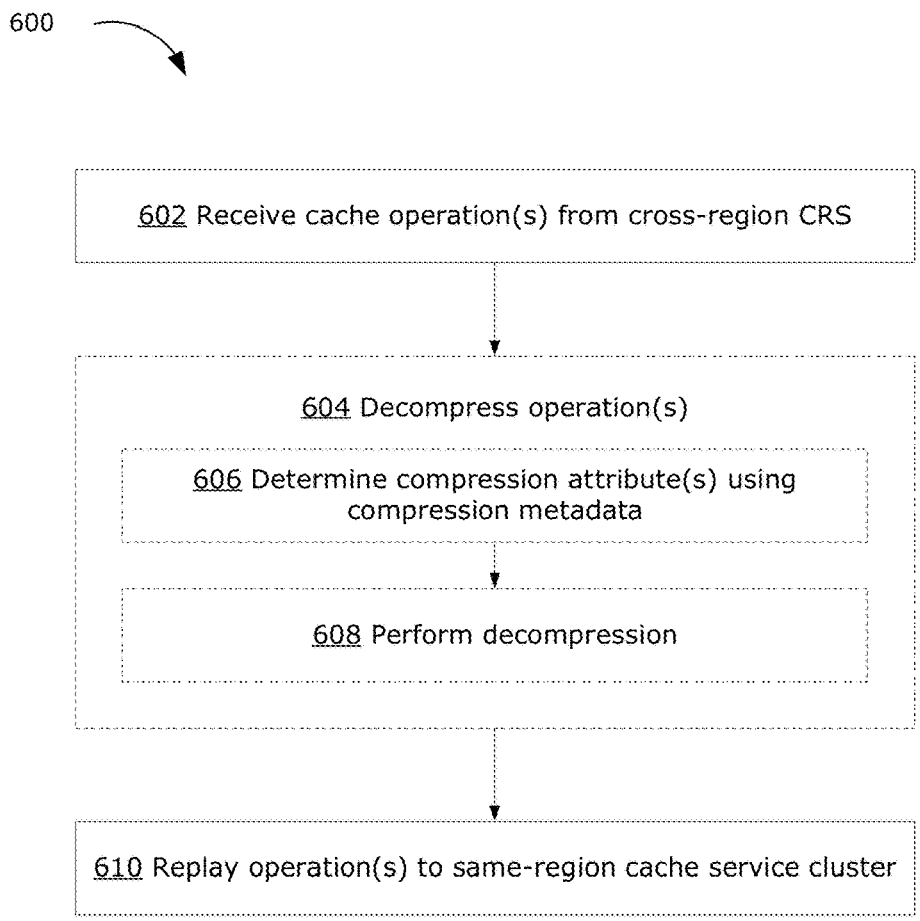
FIG. 6 is a flowchart that illustrates an example method that may be performed by the CSS in the architecture of FIG. 2.

FIG. 6 is a flowchart that illustrates an example method 600 that may be performed by the CSS 230 as part of its functions. The CSS 230 may perform the method 600 to enable cross-region replication of cache data.

At 602, the CSS 230 in a given region 210 receives one or more key-value cache operations from at least one cross-region CRS 240. Generally, the CSS 230 may receive key-value cache operation(s) from CRSs 240 in all other regions 210 of the system 200. The cross-region CRSs 240 may send key-value cache operation(s) to the CSS 230 in an asynchronous manner, and the CSS 230 may process each set of operation(s) as it arrives, and in the order of arrival.

Optionally, at 604, if the received key-value cache operation(s) has been compressed at the CRS 240 (e.g., as described in the method 400), the CSS 230 may decompress the key-value cache operation(s). In some examples, the CSS 230 may determine whether decompression is required by examining the format (e.g., compressed format or non-compressed format) of the received key-value cache operation(s). Examining the format of the received key-value cache operation(s) may also indicate whether the compression (if done) was performed using a static or dynamic compression. For example, if the compression was performed dynamically the compressed key-value cache operation(s) may be formatted with compression metadata that provides information about the compression. If the compression was performed using a static and known compression algorithm, there may be no compression metadata.

If the compression was performed using a static and known compression algorithm (e.g., using step 405 in the method 400), then the CSS 230 may use the corresponding known decompression algorithm to perform decompression.

If the compression was performed dynamically (e.g., using step 406 in the method 400), then the CSS 230 may perform steps 606 and 608 to determine the proper decompression algorithm to use and to decompress the key-value cache operation(s).

At optional 606, the CSS 230 determines, from the compression metadata associated with the compressed key-value cache operation(s), one or more compression attributes. The CSS 230 may know the format of the compression metadata and be able to parse the compression metadata to determine this information. The compression attribute(s) may include information such as an indication of the compression algorithm that was used, the original size of the data, and the compressed size of the data. Using this information, the CSS 230 may select the corresponding decompression algorithm to use. The compression attribute(s) may also provide information to enable the CSS 230 to verify whether decompression was performed correctly (e.g., by checking whether the decompressed size matches the original size indicated in the compression metadata).

At optional 608, the CSS 230 performs decompression using the selected decompression algorithm. The CSS 230 may perform verification to check that the decompression was performed correctly.

At 610, the CSS 230 replays the key-value cache operation(s) to the cache service cluster 220 (e.g., to each master 222 in the cache service cluster 220) in its region 210.

Figure 7:
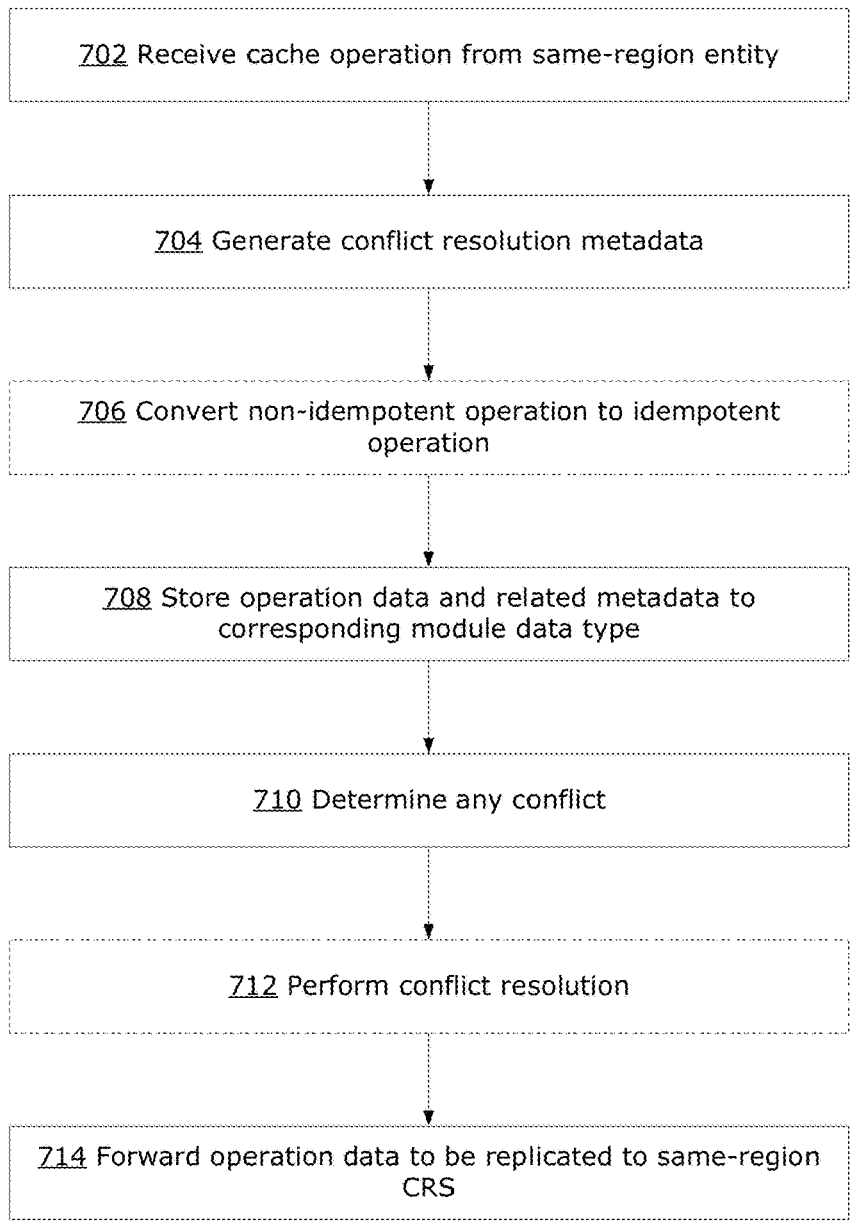
FIG. 7 is a flowchart that illustrates an example method that may be performed by a cache service server in the architecture of FIG. 2.

FIG. 7 is a flowchart that illustrates an example method 700 that may be performed by the CRDT module that is implemented by a cache service instance (e.g., the master 222 in the cache service cluster 220) as part of its functions. The method 700 may be performed by the cache service instance (which is running the CRDT module) to enable cache data to be written into its local cache (e.g., cache database).

At 702, the cache service instance in a given region 210 receives a key-value cache operation from an entity, such as the CSS 230, in the same region 210. It should be noted that although the method 700 is described in the context of a key-value cache operation received from the CSS 230, a similar method may be performed by the cache service instance server in the case where the key-value cache operation is received from a client in the same region.

At 704, conflict resolution metadata is generated. The conflict resolution metadata may include any suitable information that may be used for resolution of any possible conflict. For example, conflict resolution metadata may include a version vector, a timestamp, or any other suitable information.

Optionally, at 706, if the received key-value cache operation is a non-idempotent key-value cache operation, the key-value cache operation is converted to an idempotent key-value cache operation. Converting the key-value cache operation to an idempotent key-value cache operation may include generating state-based metadata for the key-value cache operation. Example details for performing step 706 will be discussed further below.

At 708, the cache data and any related metadata are stored to the corresponding data type. Example data types include counter module data types, non-counter or composite module data types (e.g., set and list type), among others. Example module data types are described below, which may be extended from existing data types. An example data structure for storing the cache data and related metadata together in a module data type, in accordance with the present disclosure, will be described further below.

At 710, the cache service instance determines if the cache data would conflict with any other key-value cache operation in the cache database. This determination may be performed by identifying if there is any entry in the database that has the same key-value as the cache data. If there is an entry with the same key-value, possible conflict may be determined by comparing the conflict resolution metadata of the cache data with the conflict resolution metadata of the entry. For example, if conflict resolution metadata includes a version vector, then possible conflict may be determined by comparing the version vector of the cache data with the version vector of the entry. Other ways of determining possible conflict may be used, with different types of conflict resolution metadata. If a possible conflict is determined, optional step 712 may be performed to resolve the conflict. If no conflict is determined, then the method 700 proceeds to step 714.

At optional step 712, conflict resolution is performed. The conflict resolution may be performed based on the comparison of the conflict resolution metadata. Consider the case where a new cache data to be written into the database has a first set of conflict resolution metadata, and an existing database entry (which has the same key-value as the new cache data) has a second set of conflict resolution metadata. Based on a comparison of the first and second conflict resolution metadata, one set of metadata may be found to take precedence over the other set. For example, if the conflict resolution metadata includes timestamps, then the timestamp that is later may take precedence over an earlier timestamp (following a last writer wins resolution approach). In another example, if the conflict resolution metadata includes version vectors, then a given version vector may take precedence over (or dominate) the other version vector if each and every entry in the given version vector is equal to or greater than the corresponding entry in the other version vector and there is at least one entry in the given version vector that is strictly greater than the corresponding entry in the other version vector. If the first conflict resolution metadata is found to take precedence over the second conflict resolution metadata, then the new cache data is written to the cache database; otherwise, the new cache data is discarded.

In some examples, the first and second conflict resolution metadata may be incomparable. This may be the case if the first and second conflict resolution metadata have different formats or contain different information (e.g., the first conflict resolution metadata has only a timestamp, but the second conflict resolution metadata has only a version vector, or the version vectors between the first and second conflict resolution metadata have different vector length). The first and second conflict resolution metadata may also be incomparable if they have the same formats but the result of the comparison is indefinite. For example, if a given version vector has some entries greater than corresponding entries in the other version vector, but the given version vector also has some entries that are lesser than corresponding entries in the other version vector, the two version vectors may be considered incomparable. In the case where the conflict resolution metadata is incomparable (or where the comparison gives an indefinite result), the cache service may use predefined CRDT rules for resolving the conflict. Some example predefined CRDT rules for conflict resolution include: resolution based on the alphanumerical order of the region ID, available zone ID, or cluster ID; or resolution according to predefined priority order between regions, available zones, or clusters.

Generally, conflict resolution may be performed for each received new operation against an existing database entry having the same key-value, before writing the new operation to the cache database (or discarding the new operation). This may also be referred to as merging a new received key-value operation with an existing database entry having the same key-value. For example, to merge the data and metadata for a string data type, the key-value operation with a larger version vector will overwrite the one with a smaller version vector. If the two version vectors are not comparable, the operation with a larger (i.e., later) timestamp will overwrite the one with a smaller timestamp. Different data types have different merging algorithms based on predefined CRDT rules.

At 714, the cache data (if it is written to the cache database successfully) is forwarded to be replicated to the CRS 240 in the same region 210. For example, a master cache service instance replicates the cache data to its slave cache service instance, and the slave cache service instance in turn replicates the cache data to the CRS 240.

The methods 400, 600 and 700 may be used together by the CRS 240, CSS 230 and masters 222 in the cache service cluster 220, in accordance with the relationships illustrated in FIG. 2. Thus, a user operation from a client 205 (i.e., an operation from a user of cache service or applications that accesses the cache database through a client) may be processed and replicated across all regions 210 of the system 200.

In some aspects, the present disclosure describes example methods for converting non-idempotent key-value cache operations to idempotent key-value cache operations. Such methods may be used as part of the method 700 (e.g., at step 706). Generally, a non-idempotent key-value cache operation may be converted to idempotent key-value cache operation by attaching state metadata to the cache data, such that the key-value cache operation becomes state-based (and hence idempotent). There are different ways to generate and attach state metadata to cache data. An example is described below.

Figure 8:
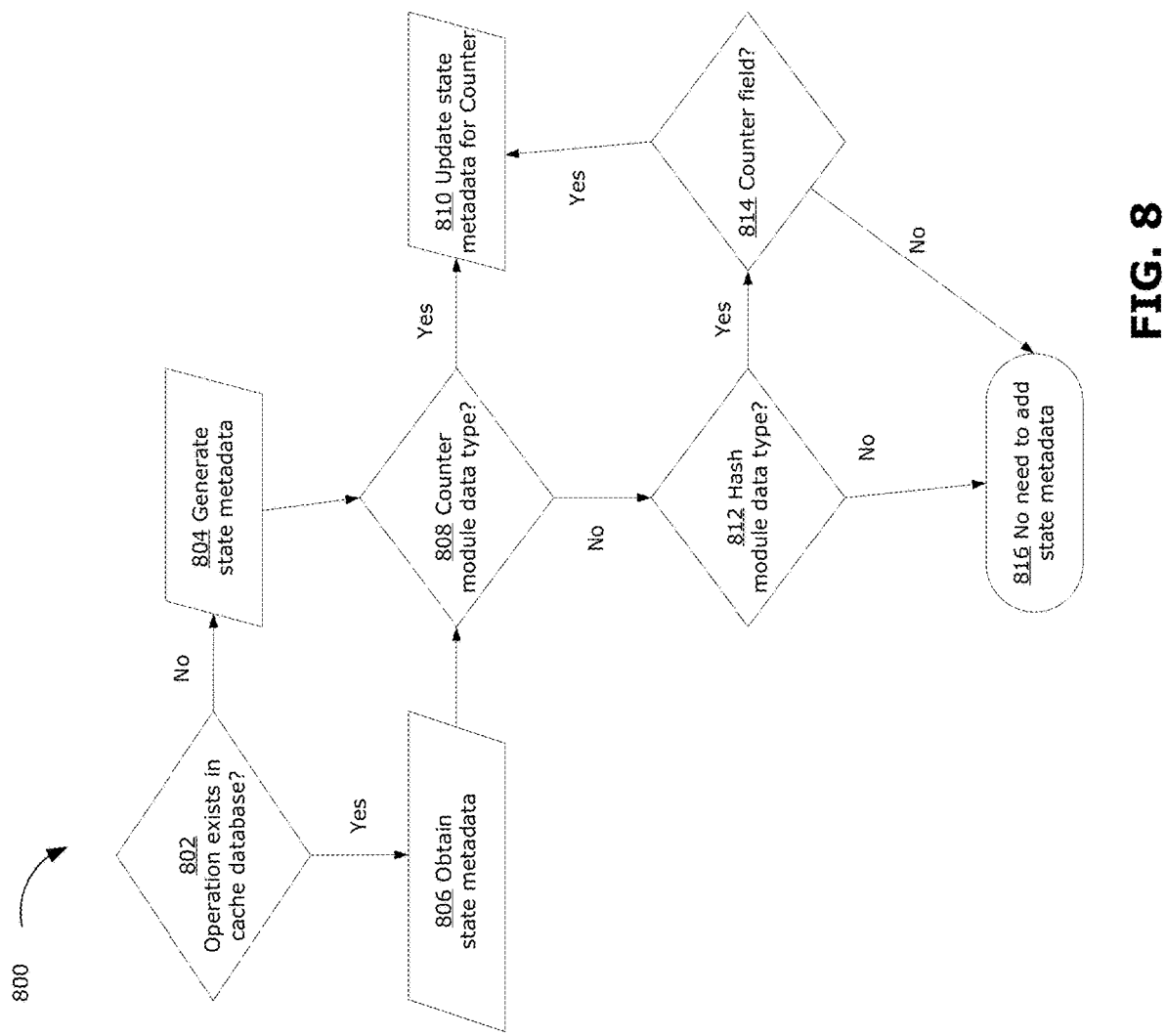
FIG. 8 is a flowchart that illustrates another example method that may be performed by a cache service server in the architecture of FIG. 2.

FIG. 8 is a flowchart that illustrates an example method 800 that may be performed by the CRDT module that is implemented by a cache service instance (e.g., the master 222 in the cache service cluster 220) as part of its functions. The method 800 may be performed to convert a non-idempotent key-value cache operation into an idempotent key-value cache operation (e.g., for a non-idem potent key-value cache operation received from a same-region client, or received from a same-region CSS 230). The method 800 may be executed by a processing device implementing a cache service instance (which is running the CRDT module), for example by executing instructions stored in memory. The method 800 may be performed as part of the method 700, for example to perform step 706.

At 802, the cache service server determines whether the cache data already has an existing entry in the cache database. For a key-value cache database, this determination may be performed by determining whether an entry having the same key-value already exists.

If there is no corresponding existing entry in the cache database, then at 804 new state metadata is generated for the cache data. Generating the state metadata may include initiating metadata values to a default value (e.g., counter set to zero). The method 800 then proceeds to step 808.

If there is a corresponding existing entry in the cache database, then, at 806, the state metadata of that corresponding entry is obtained. The method 800 then proceeds to step 808.

Generally, state metadata associated with cache data may include origin information such as region identifier (ID) and/or cluster ID, which may be used to identify the region and/or cluster from which the cache data originates. Origin information may be used by entities within a given region to determine whether the cache data originates from the same given region or from another region. If the cache data originates from another region, then the cache data should not be broadcasted to other regions, to avoid circular data replication. Conflict resolution metadata may be included in state metadata (e.g., state metadata may include information for conflict resolution, such as version vector and/or timestamp). In other examples, conflict resolution metadata may be separate from state metadata.

The state metadata is updated depending on the data type of the key-value cache operation. A counter module data type and a non-counter (or composite) module data type are discussed below. Possible non-counter data types include set, hash and list, among others. State metadata may be updated in various appropriate ways for different data types. It should also be noted that different data types may have different types or different formats of state metadata.

At 808, it is determined whether the key-value cache operation is a counter module data type.

If a counter module data type is determined, then at 810 the state metadata is updated with the number of increments and/or decrements specified in the cache data. The method 800 then ends.

If a counter module data type is not determined, then at 812 it is determined whether the operation is a hash module data type.

If a hash module data type is determined, then at 814 it is determined whether the field data type is a counter field. If a counter field is determined, the method 800 proceeds to step 810 to update the state metadata with the number of increments and/or decrements specified.

If a counter field is not determined at 814, or if a hash module data type is not determined at 812, then the method 800 proceeds to step 816.

At 816, no action may be required for updating state metadata, and the method 800 ends.

The method 800 may be performed for each write operation in user operations received from a client in the same region. It may not be necessary to perform conversion to idempotent key-value cache operation for cache data received from the CSS 230 because key-value cache operations received from the CSS 230 may have already been converted to idempotent key-value cache operations in the originating region (before being sent cross-region to the CSS 230).

The method 800 described above includes example steps for converting non-idempotent key-value cache operations to idempotent key-value cache operations, based on certain data types. Although counter and hash data types (with a counter field) are discussed above, it should be understood that conversion from non-idempotent key-value cache operations to idempotent key-value cache operations may be similarly carried out for other data types.

Figure 9:
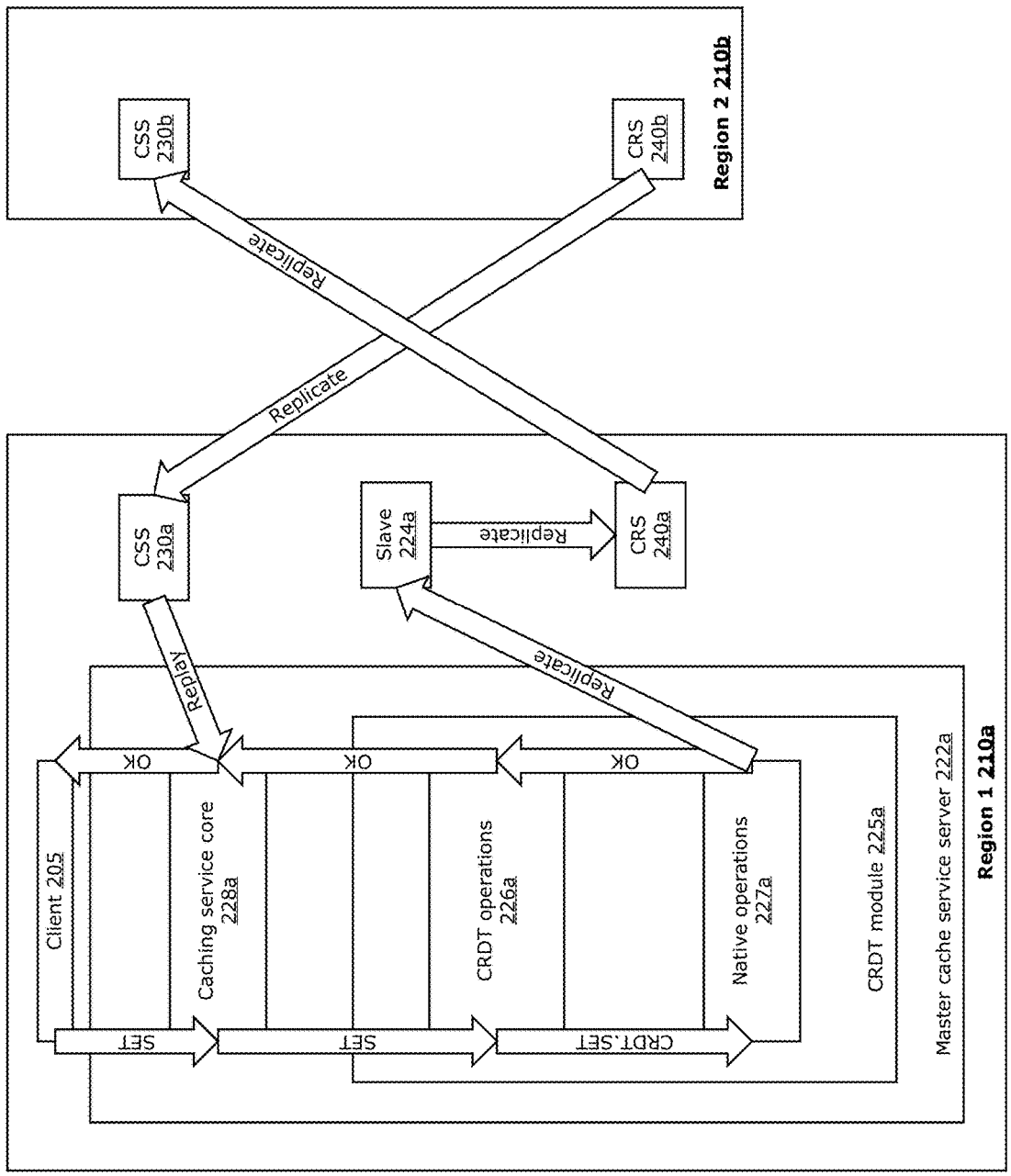
FIG. 9 is a simplified block diagram illustrating example processes carried out by a cache service server in the architecture of FIG. 2.

FIG. 9 is a simplified block diagram illustrating example processes carried out by a cache service instance running a CRDT module. This block diagram is a simplification of the system diagram of FIG. 2, in order to focus on details of the operations of the CRDT module. Although details are only shown for some entities in region 1 210*a*, it should be understood that similar details may be found in other regions 210 of the system 200.

One master cache service instance 222*a* (or simply master 222*a*) is shown in detail, including a CRDT module 225*a* implemented on the master 222*a*. The master 222*a* also implements a cache service core 228*a* (e.g., core code of an existing data store e.g., cache database), such as Redis). The CRDT module 225*a*, which is an add-on to the cache service core 228*a*, may be loaded and initialized when the master 222*a* is first started up. The CRDT module 225*a* provides CRDT operations 226*a* including a CRDT specific SET command which, in the context of Redis as the core caching data store, may be implemented using a new Redis command CRDT.SET. The CRDT module 225*a* may also provide native operations 227*a*, which includes a SET command that is original to the cache service core 228*a*, and which, in the context of Redis, may be implemented using a new Redis command NATIVE.SET.

The client 205 in region 1 210*a* sends a user operation (e.g., a SET command) to the cache service cluster in the same region 210*a*. The SET command will set the key-value of cache data. At the cache service cluster, the command is processed by a master 222*a*, using the cache service core 228*a*. It should be noted that key-value cache operations replayed by the CSS 230*a* to the master 222*a* are also processed first at the cache service core 228*a* of the master 222*a*. The cache service core 228*a* forwards the key-value cache operation to the CRDT module 225*a*.

At the CRDT module 225*a*, the key-value cache operation is processed first using the CRDT operations 226*a*. The CRDT operations 226*a* include generating conflict resolution metadata for the cache data, adding state metadata for any non-idempotent key-value cache operations, and storing the cache data and its related metadata together in a module data type. For example, the CRDT operations 226*a* may include steps 704-708 of FIG. 7.

Following the CRDT operations 226*a*, the cache data is forwarded (e.g., via a CRDT.SET command) to the native operations 227*a*. The native operations 227*a* include writing the cache data (including the CRDT metadata) to the cache database (and performing any required conflict resolution), and replicating the cache data to the slave 224*a* (which in turn replicates the cache data to the same-region CRS 240*a*). The native operations 227*a* may include performing a NATIVE.SET command for writing the cache data to the cache database. For example, the native operations 227*a* may include steps 710-714 of FIG. 7.

After the cache data has been successfully replicated, the native operations 227*a* may forward an OK message to the CRDT operations 226*a* to indicate the cache data was successfully written to the cache database and replicated. The OK message may be forwarded by the CRDT operations 226*a* to the cache service core 228*a* and in turn to the client 205.

Cross-region replication of cache data is performed by the CRS 240*a* to the CSS 230*b* of region 2 210*b* (and other CSSs 230 of other regions 210 in the system 200). Similarly, cross-region cache data is replicated from the CRS 240*b* of region 2 210*b* (and other CRSs 240 of other regions 210 in the system 200) to the CSS 230*a* of region 1 210*a*.

In some aspects, the present disclosure describes example data structures for collocating conflict resolution metadata and state metadata with the related cache data. An example module data type is disclosed that may be used to store the cache data together with its metadata. This module data type, by storing the cache data and its metadata together, may enable better data mobility and reduce the risk that the cache data becomes separated from its metadata.

Figure 10:
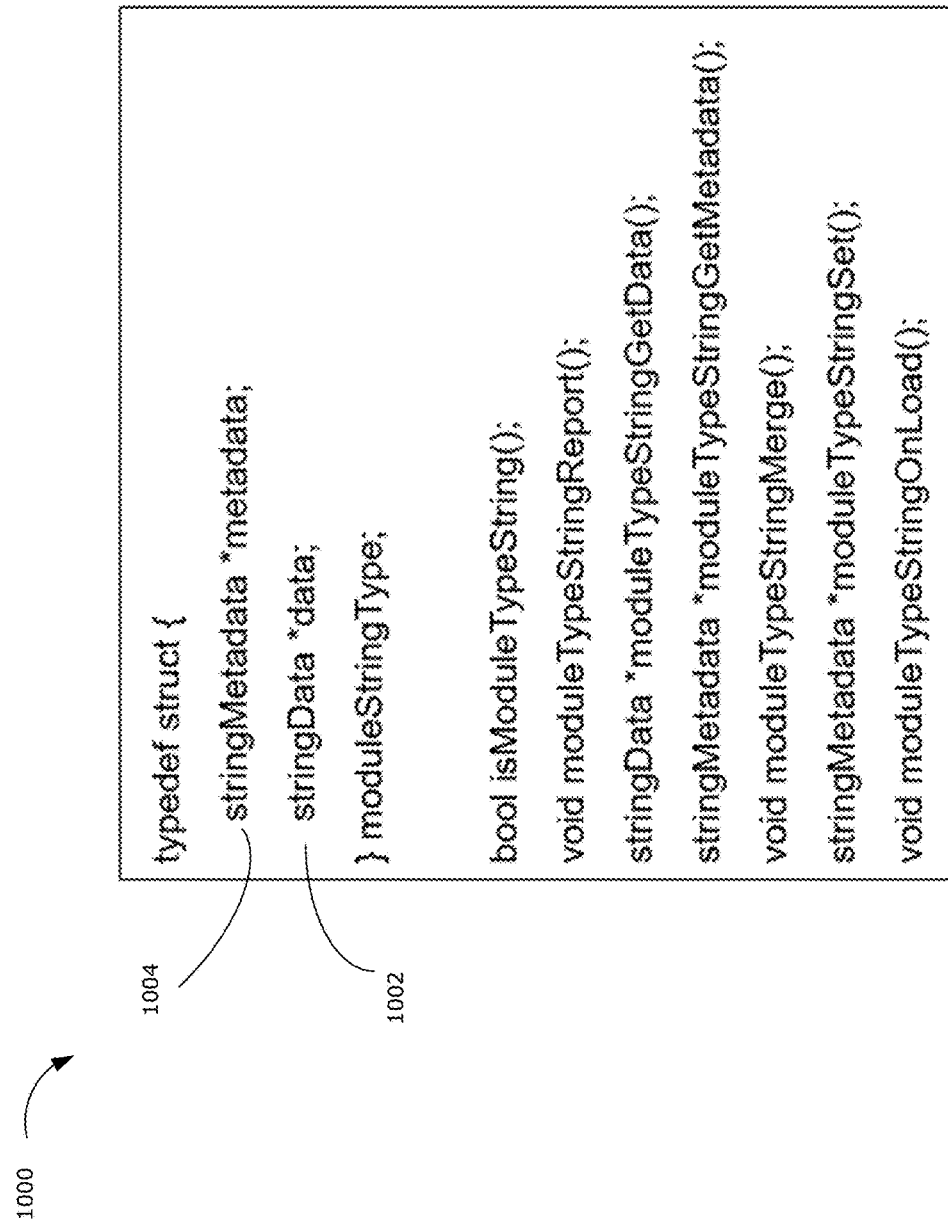
FIG. 10 illustrates an example data structure definition for a data structure that collocates cache data with its related metadata, in accordance with example embodiments described herein.

FIG. 10 illustrates an example data structure 1000 for a key-value cache operation that collocates cache data with its related metadata by, for example, appending the cache data with its related metadata. This definition 1000 may be registered as a new module data type extended from its corresponding original data type (e.g., count data type, non-count data type, composite data type, etc.) in the extendable module of a cache service (e.g., in the CRDT module as an extension of Redis).

As shown in FIG. 10, the data structure defines a data field 1002 according to the original data type of the cache data, for containing the cache data. The data structure also defines a metadata field 1004, for containing the conflict resolution and state metadata. All cache key-value operation types for the data field are derived from the original data type, and all key-value cache operation types are implemented for the metadata field. In the example definition 1000, the key-value cache operation types:

stringMetadat *moduleTypeStringGetMetadata( );
void moduleTypeStringMerge( );
stringMetadata *moduleTypeStringSet( );

have been implemented for the metadata field 1004. Others are derived from the original data types and implemented for the data field 1002.

Using this module data type, to be used in the CRDT module, the cache data and related metadata are contained together in one data structure. Because the disclosed module data type builds on original data types and is used in the CRDT module, this module data type may have little or no impact on current data structures and implementation. FIG. 10 shows an example implementation, however different data structures may be defined to similarly contain cache data and related metadata together.

In various examples, the present disclosure describes systems and methods that enable cross-region active-active data replication of cache data between key-value cache service instances of a cache service of in cloud computing. The present disclosure has described various aspects. In some aspects, a module (e.g., the CRS) has been described for replicating cache key-value operations to other regions, serving as a slave to multiple sources in the same region. In some aspects, a module (e.g., the CSS) has been described for synchronizing key-value cache operations from other regions to multiple targets in the same region, serving as the client to the same-region targets.

In some aspects, a method has been described for dynamically compressing key-value cache operations (e.g., using different compression algorithms, or omitting compression altogether, based on the payload size and type) before sending the key-value cache operations to other cache service instances. A compression algorithm is selected from among different available compression algorithms to compress the key-value cache service operations on-the-fly, according to their payload size and/or type. Compression attributes are stored in compression metadata with the compressed data. The compressed operations together with the compression metadata may be then written/read to/from the cache operation log, using a suitable format of the cache service, such as RESP for Redis.

In some aspects, a method has been described for converting non-idempotent key-value cache operations of a cache service to idempotent key-value cache operations. Non-idempotent key-value cache operations of the key-value cache service may be converted to idempotent key-value cache operations by the addition of state metadata. Then state-based CRDT may be used to resolve any conflicting operations.

In some aspects, a built-in conflict resolution module (e.g., the CRDT module) has been described for resolving conflicting cache operations. A built-in conflict resolution mechanism for cache operations may be added through the extendable module, such that a slave cache instance can replicate operations from multiple master instances.

In some aspects, a data structure has been described for storing conflict resolution metadata (and other metadata, such as state metadata) together with the related cache data. The data structure collocates the metadata with related cache data using extendable module data types of the key-value cache service. This may help to ensure the migration of data and related metadata as one atomic transaction.

Examples of the present disclosure may help to provide a cross-region active-active key-value cache service with global, reliable, and high performance cloud applications for end users and clients.

In some examples, cross-region transportation of cache operations may be faster and/or more reliable, using dynamic compression according to size and/or type of operations in the payload.

In some examples, conflict resolution of cache operations may be faster and/or more reliable, because non-idempotent key-value cache operations can be converted to idempotent key-value cache operations and conflicts resolved using the state-based CRDT.

In some examples, replication of cache operations from multiple master-slave pairs may be faster and/or more reliable, by the use of a built-in conflict resolution mechanism through the extendable modules of the cache service.

In some examples, conflict resolution of cache operations may preserve data mobility, by collocating conflict resolution metadata with the related cache data in the extendable module data types of the cache service.

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system for cross-region data management in an active-active architecture, the system comprising:
   at least one cache service instance belonging to a first region;
   a first cross-region replication service (CRS) belonging to the first region; and a first cross-region synchronization service (CSS) belonging to the first region;
the first CRS being configured to:
receive a same-region key-value cache operation from the at least one cache service instance; and
replicate the same-region key-value cache operation to a second CSS belonging to a second region;
the first CSS being configured to:
receive a cross-region cache key-value cache operation from a second CRS belonging to the second region; and
replay the cross-region key-value cache operation to the at least one cache service instance; and
the at least one cache service instance configured to execute a conflict-free replicated data type (CRDT) module to:
receive cache data contained in the same-region key-value cache operation from a client of the first region or contained in the cross-region key-value cache operation from the first CSS;
resolve any conflict between the cache data and existing entries in a cache database belonging to the first region;
write the cache data to the cache database; and
replicate the written cache data to the CRS.

2. The system of claim 1, wherein the at least one cache service instance is further configured to execute the CRDT module to:
convert non-idempotent key-value cache operation to idempotent key-value cache operation by appending state metadata to the non-idempotent key-value cache operation.

3. The system of claim 2, wherein the at least one cache service server is further configured to execute the CRDT module to:
store state metadata together with related cache data in a single data structure.

4. The system of claim 1, wherein the cache data is associated with related conflict resolution metadata, and wherein the conflict resolution metadata comprises information for resolving any conflict with existing entries in the cache database.

5. The system of claim 4, wherein the at least one cache service instance is further configured to execute the CRDT module to:
determine a conflict between the cache data and an existing entry in the cache database; and
resolve the conflict based on a comparison between first conflict resolution metadata associated with the cache data and second conflict resolution metadata associated with the existing entry.

6. The system of claim 4, wherein the cache data and the conflict resolution data is stored together in a single data structure.

7. The system of claim 1, wherein the CRS module is further configured to:
compress the same-region key-value cache operation, wherein the same-region key-value cache operation is replicated to the second CSS as compressed data.

8. The system of claim 1, wherein the same-region key-value cache operation is stored in a queue of the CRS module, and wherein the CRS module is further configured to:
compress data in the queue when the data in the queue is at least a threshold size; and
wherein the same-region key-value cache operation is replicated to the second CSS as compressed data.

9. The system of claim 1, wherein the same-region key-value cache operation is stored in a queue of the CRS module, and wherein the CRS module is further configured to:
compress data in the queue using a selected compression algorithm selected from a plurality of different compression algorithm, the selected compression algorithm being selected based on data types stored in the queue; and
wherein the same-region cache key-value operation is replicated to the second CSS as compressed data.

10. The system of claim 9, wherein the CRS module is further configured to:
generate compression metadata providing information about the selected compression algorithm; and
append the compression metadata to the compressed data.

11. The system of claim 10, wherein the CRS module is further configured to:
write the compressed data together with the compression metadata to a cache operation log maintained in the first region.

12. A method for cross-region data management in an active-active architecture, the method comprising
receiving cache data contained in a same-region key-value cache operation from a client of the first region or contained in a cross-region key-value cache operation from a cross-region synchronization service (CSS) belonging to a first region;
resolving any conflict between the cache data and existing entries in a cache database belonging to the first region;
writing the cache data to the cache database; and
replicating the written cache data to a cross-region replication service (CRS) belonging to the first region.

13. The method of claim 12, further comprising:
converting non-idempotent key-value cache operations to idempotent cache data by appending state metadata to the non-idempotent key-value cache operations.

14. The method of claim 13, further comprising:
storing state metadata together with related cache data in a single data structure.

15. The method of claim 12, wherein the cache data is associated with related conflict resolution metadata, and wherein the conflict resolution metadata comprises information for resolving any conflict with existing entries in the cache database.

16. The method of claim 15, further comprising:
determining a conflict between the cache data and an existing entry in the cache database; and
resolving the conflict based on a comparison between first conflict resolution metadata associated with the cache data and second conflict resolution metadata associated with the existing entry.

17. The method of claim 15, wherein the cache data and the conflict resolution data is stored together in a single data structure.

18. A method for cross-region data management in an active-active architecture, the method comprising:
receiving a same-region key-value cache operation from at least one cache service instance belonging to a first region;
compressing the same-region key-value cache operation; and
replicating the same-region key-value cache operation, as compressed data, to a cross-region synchronization service (CSS) belonging to a second region.

19. The method of claim 18, wherein the same-region key-value cache operation is stored in a queue, and wherein the method further comprises:
- compressing data in the queue when the data in the queue is at least a threshold size.

20. The method of claim 18, wherein the same-region key-value cache operation is stored in a queue, and wherein the method further comprises:
- compressing data in the queue using a selected compression algorithm selected from a plurality of different compression algorithm, the selected compression algorithm being selected based on data types stored in the queue.

21. The method of claim 20, further comprising:
- generating compression metadata providing information about the selected compression algorithm;
- appending the compression metadata to the compressed data; and
- writing the compressed data together with the compression metadata to a cache operation log maintained in the first region.

* * * * *